J. F. ROWLEY.
TRANSPLANTING DEVICE.
APPLICATION FILED DEC. 12, 1921.
1,431,185. Patented Oct. 10, 1922.
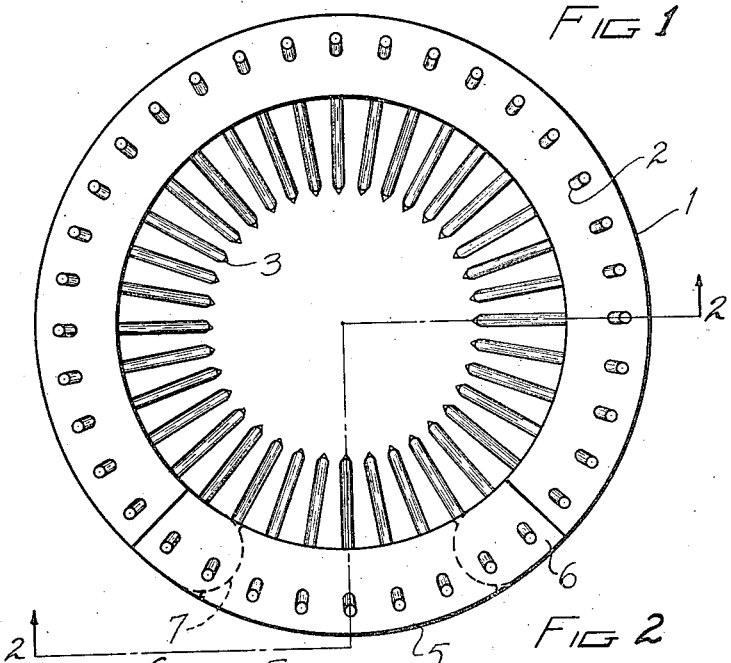
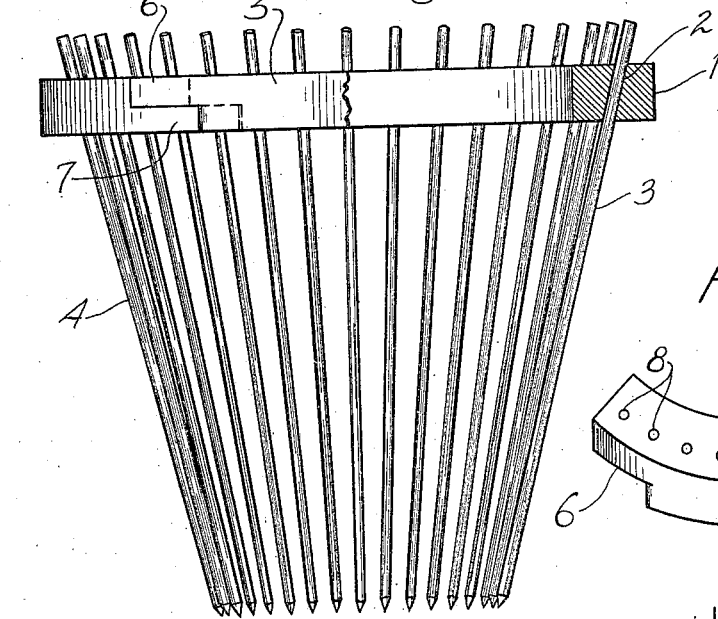
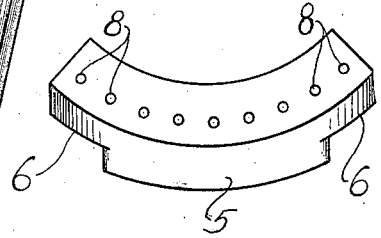
Witness,
INVENTOR
James F. Rowley,
by Kummler & Kummler
ATTYS.

Patented Oct. 10, 1922.

1,431,185

UNITED STATES PATENT OFFICE.

JAMES F. ROWLEY, OF CHICAGO, ILLINOIS.

TRANSPLANTING DEVICE.

Application filed December 12, 1921. Serial No. 521,816.

*To all whom it may concern:*

Be it known that I, JAMES F. ROWLEY, a citizen of the United States of America, and resident of Chicago, county of Cook, and State of Illinois, have invented a new and useful Improvement in Transplanting Devices, of which the following is a specification.

This invention relates to devices for use in transplanting young trees, bushes, plants, and the like.

The main objects of this invention are to provide an improved form of transplanting device which is simple, inexpensive and effective for removing the plant and roots together with a batch of the surrounding dirt; and to provide a transplanting device having an improved form and arrangement of gate to permit the device to be placed on the ground in operative position around the plant stem.

An illustrative embodiment of this invention is shown in the accompanying drawings, wherein—

Figure 1 is a top plan of a transplanting device embodying this invention.

Figure 2 is a side elevation, partly in section, taken on the line 2—2 of Figure 1.

Figure 3 is a perspective view of the removable section of the base which forms a gate to permit the device to be placed around the plant stem.

In transplanting bushes or plants in bloom, great care must be taken to prevent the roots from being disturbed and it is, therefore, desirable that a considerable amount of the surrounding dirt be moved bodily and transplanted with the plant and roots.

In the form shown, the present invention includes a base adapted to be supported on the ground surrounding the plant or tree and a plurality of pins which are adapted to be driven downwardly through apertures formed in the base so as to provide an inclosure for the plant roots, which serves as a scoop for bodily removing the plant and roots and inclosed dirt from the ground.

Referring to the drawings, the device comprises an annular base 1, preferably in the form of a laminated wood structure to prevent splitting. Extending through the base, is a plurality of annularly arranged apertures 2 inclined inwardly and downwardly to receive a plurality of pointed pins 3, which are adapted to be driven through the apertures into the ground so as to provide an inverted frusto-conical inclosure 4, which serves as a scoop for removing the inclosed batch of dirt and roots from the ground without injury to the plant. The pins 3 fit snugly within the apertures 2 so as not to fall out when the plant is being carried.

The annular base 1 is formed with a removable section 5 arranged to provide a gate to permit the device to be placed around a plant stem or trunk of a young tree without injury to the branches. The opposed ends of the section 5 and base 1 are suitably formed to provide interfitting shoulders 6 and 7 respectively, arranged to hold the gate in the plane of the base. Extending through the interfitting shoulders 6 and 7 are registering apertures 8 for receiving certain of the pins 3 for locking the gate to the annular base.

In operation, the gate 5 is removed to permit the annular base to be placed on the ground surrounding the tree trunk or stem of the plant which is to be transplanted and when the base has been placed in proper position the gate may again be inserted between the shoulders 7. The pins 3 are then inserted into the apertures 2 and 8 and driven into the ground until the upper ends of the pins are flush with the top face of the base. After loosening or removing some of the dirt surrounding the inclosure 4 formed by the pins 3, the device may be lifted out of the ground and with it is lifted the plant including the roots and batch of dirt which is inclosed by the pins 3.

It is apparent from the foregoing description that the present invention provides a transplanting device which is simple and effective and which will permit the transplanting of a tree or plant without disturbing the roots.

Although but one specific embodiment of this invention has been herein shown and described it will be understood that numerous details of the construction shown may be altered or omitted without departing from the spirit of this invention as defined by the following claim.

I claim:

A transplanting device comprising an annular base adapted to be arranged on the ground surrounding a plant stem and having a plurality of annularly arranged inclined apertures extending downwardly therethrough, said base having a removable section forming a gate to permit the device to be placed around the stem, said gate and base having coacting shoulders for holding said gate in the plane of said annular base, said coacting shoulders having downwardly extending apertures adapted for register, and a plurality of pins adapted to be driven through said apertures into the ground so as to form an inclosure for the roots of the plant and permit the roots and inclosed dirt to be bodily transplanted, said registering apertures being arranged to receive certain of said pins for locking said gate to the base.

Signed at Chicago this 10 day of Dec. 1921.

JAMES F. ROWLEY.